United States Patent
Kim

(10) Patent No.: US 10,965,025 B2
(45) Date of Patent: Mar. 30, 2021

(54) SELF-CALIBRATION METHOD OF SWITCHED ARRAY ANTENNA RADAR

(71) Applicant: Electronics and Telecommunications Research Insitute, Daejeon (KR)

(72) Inventor: Dong Kyoo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 384 days.

(21) Appl. No.: 15/901,161

(22) Filed: Feb. 21, 2018

(65) Prior Publication Data

US 2018/0294564 A1 Oct. 11, 2018

(30) Foreign Application Priority Data

Apr. 11, 2017 (KR) .................. 10-2017-0046570

(51) Int. Cl.
*H01Q 3/26* (2006.01)
*H04B 17/21* (2015.01)
(Continued)

(52) U.S. Cl.
CPC ......... *H01Q 3/2652* (2013.01); *G01S 7/4052* (2013.01); *G01S 13/02* (2013.01);
(Continued)

(58) Field of Classification Search
CPC ...... H01Q 3/267; H01Q 3/2605; H01Q 1/246; H01Q 3/26; H01Q 21/0025; H01Q 21/29;
(Continued)

(56) References Cited

U.S. PATENT DOCUMENTS 6,205,341 B1 * 3/2001 Monot ............... H04B 7/04
455/101
6,480,153 B1 * 11/2002 Jung ............... H01Q 3/267
342/174
(Continued)

FOREIGN PATENT DOCUMENTS

KR 10-0762218 B1 10/2007
KR 10-2016-0132166 A 11/2016

OTHER PUBLICATIONS

John E. Peabody, et al., "Through-Wall Imaging Radar," Massachusetts Insitute of Technology—Lincoln Laboratory Journal, vol. 19, No. 1, Jan. 2012, pp. 62-72.
(Continued)

*Primary Examiner* — Olumide Ajibade Akonai
(74) *Attorney, Agent, or Firm* — NSIP Law

(57) ABSTRACT

Disclosed is a self-calibration method and apparatus for an array antenna system. According to an embodiment of the present disclosure, a correction method of an array antenna system includes: deriving, at a first time, a correction factor $R_{i,j}$ for a path connecting an i-th (i is an integer equal to or greater than one and equal to or less than m) transmission antenna and a j-th (j is an integer equal to or greater than one and equal to or less than n) reception antenna; deriving, at a second time, a calibration factor $\hat{Q}_{i,j}$ for the path connecting the i-th transmission antenna and the j-th reception antenna; and performing, based on the $\hat{Q}_{i,j}$, calibration on the path connecting the i-th transmission antenna and the j-th reception antenna.

20 Claims, 18 Drawing Sheets

(51) Int. Cl.
*H04B 17/14* (2015.01)
*G01S 13/02* (2006.01)
*G01S 7/40* (2006.01)
*G01S 13/88* (2006.01)
*G01S 13/931* (2020.01)

(52) U.S. Cl.
CPC ............. *H01Q 3/267* (2013.01); *H04B 17/14* (2015.01); *H04B 17/21* (2015.01); *G01S 13/888* (2013.01); *G01S 13/931* (2013.01); *G01S 2007/4065* (2013.01); *G01S 2013/0254* (2013.01); *G01S 2013/0263* (2013.01)

(58) Field of Classification Search
CPC ... H01Q 3/28; H01Q 3/36; H01Q 3/30; H04B 17/12; H04B 17/21; H04B 17/11; H04B 7/0413; H04B 17/14; H04B 1/0475; H04B 7/0626; H04B 1/44; H04B 7/0417; H04B 7/0617; G01S 17/87; G01S 13/02; H04W 24/02
USPC .......................................................... 342/174
See application file for complete search history.

(56) References Cited

U.S. PATENT DOCUMENTS

| | | | |
|---|---|---|---|
| 8,971,178 B1* | 3/2015 | Nabar | ....................... H04J 3/16 370/220 |
| 9,035,821 B2 | 5/2015 | Feil | |
| 9,172,454 B2 | 10/2015 | Harel et al. | |
| 2004/0214604 A1* | 10/2004 | Yoon | ....................... H01Q 3/267 455/562.1 |
| 2005/0001760 A1* | 1/2005 | Mrstik | ................... H01Q 3/267 342/174 |
| 2005/0140546 A1 | 6/2005 | Park et al. | |
| 2009/0196365 A1* | 8/2009 | Takano | ............... H04L 25/0206 375/260 |
| 2010/0015928 A1* | 1/2010 | Takano | ................... H04B 17/21 455/73 |
| 2010/0020857 A1* | 1/2010 | Takano | ................... H04B 17/21 375/219 |
| 2010/0067588 A1* | 3/2010 | Takano | ................ H04B 7/0689 375/260 |
| 2015/0301185 A1 | 10/2015 | Shin et al. | |
| 2017/0168140 A1* | 6/2017 | Hosokawa | ............. H04B 1/525 |
| 2017/0346575 A1* | 11/2017 | Tang | ...................... H04B 17/12 |

OTHER PUBLICATIONS

Praveen Sharma, et al., "Miniature Radar for Mobile Devices," Proceedings of the IEEE High Performance Extreme Computing Conference, Sep. 2013, Waltham, MA, USA (4 pages, in English).

Chenxi Hu, et al., "Randomized Switched Antenna Array FMCW Radar for Automotive Applications," IEEE Transaction on Vehicular Technology, vol. 63, Issue 8, Oct. 2014, pp. 1-18.

Dong Kyoo Kim, et al., "Self-Calibration for Arrayed Penetrating Radar," Proceedings of the 19th International Conference on Advanced Communications Technology, Feb. 2017, Phoenix Park, Pyeongchan (5 pages, in English).

\* cited by examiner

【FIG. 1】
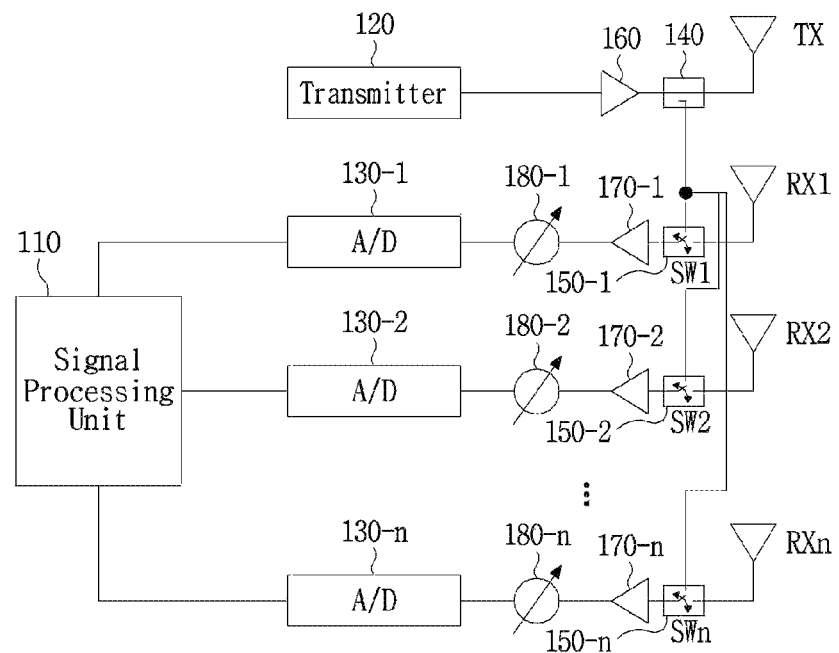

【FIG. 2】
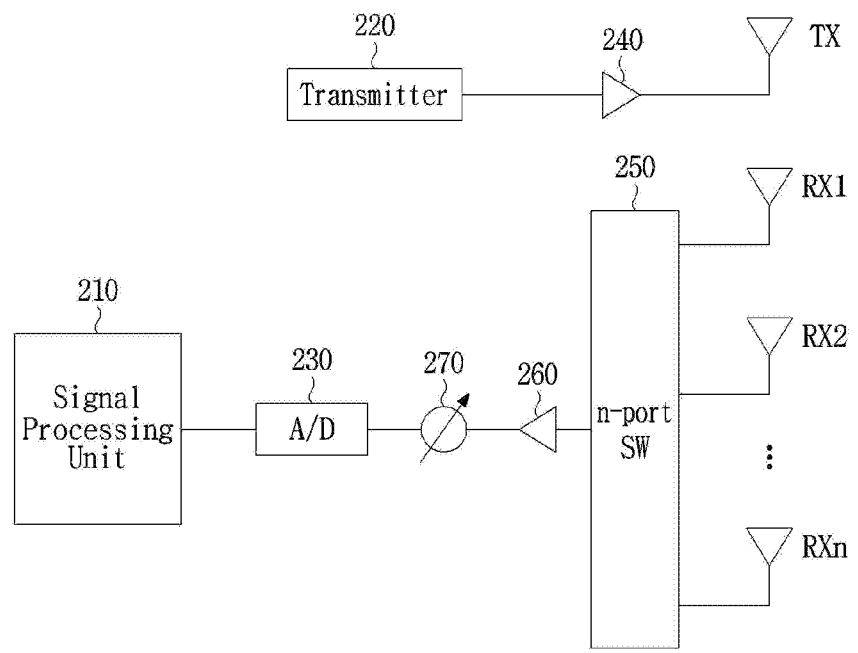

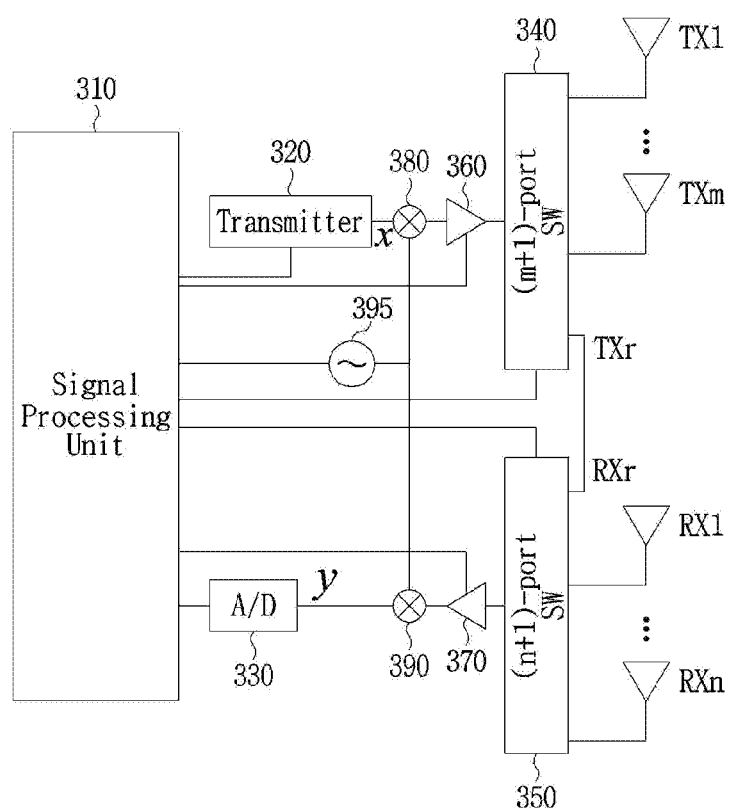
[FIG. 3]

[FIG. 4]
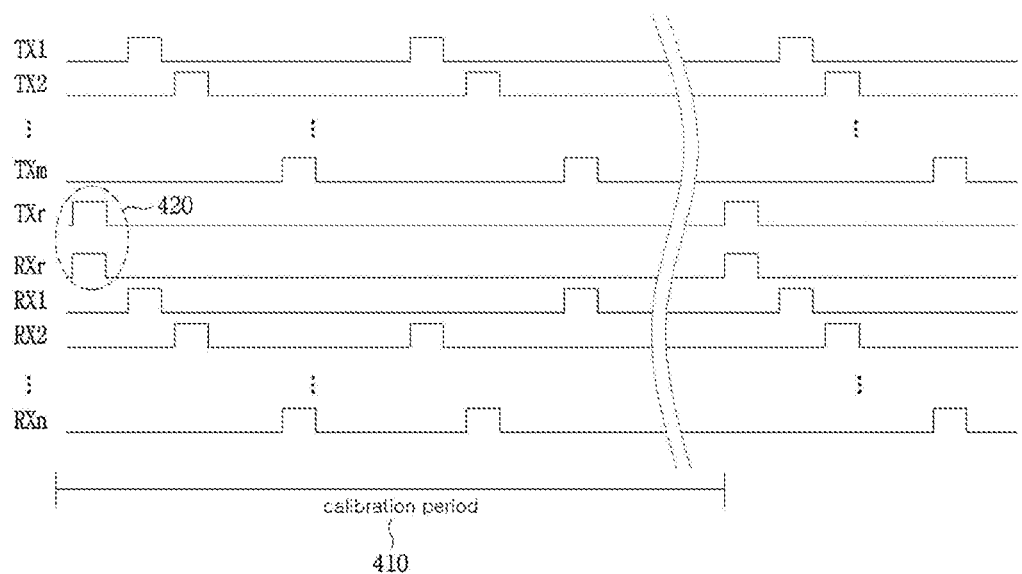

[FIG. 5]
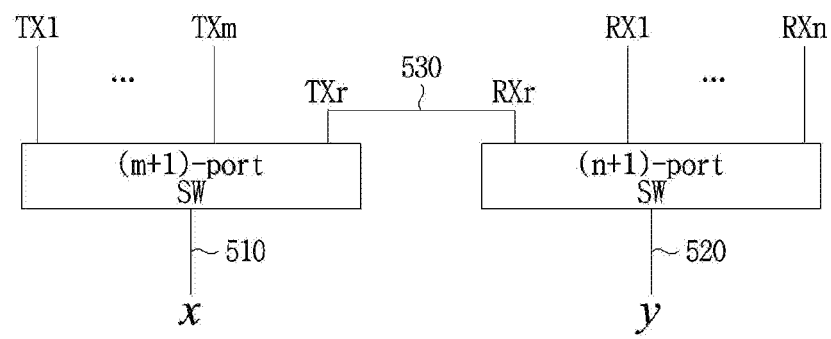

[FIG. 6]
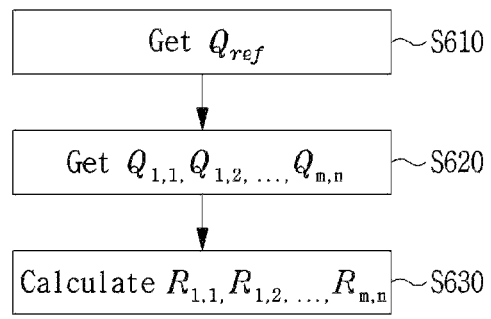

[FIG. 7]
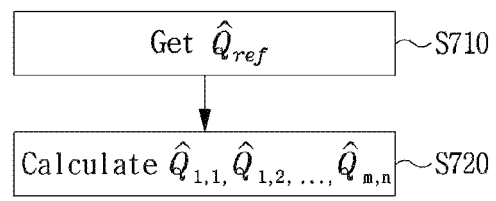

[FIG. 8]
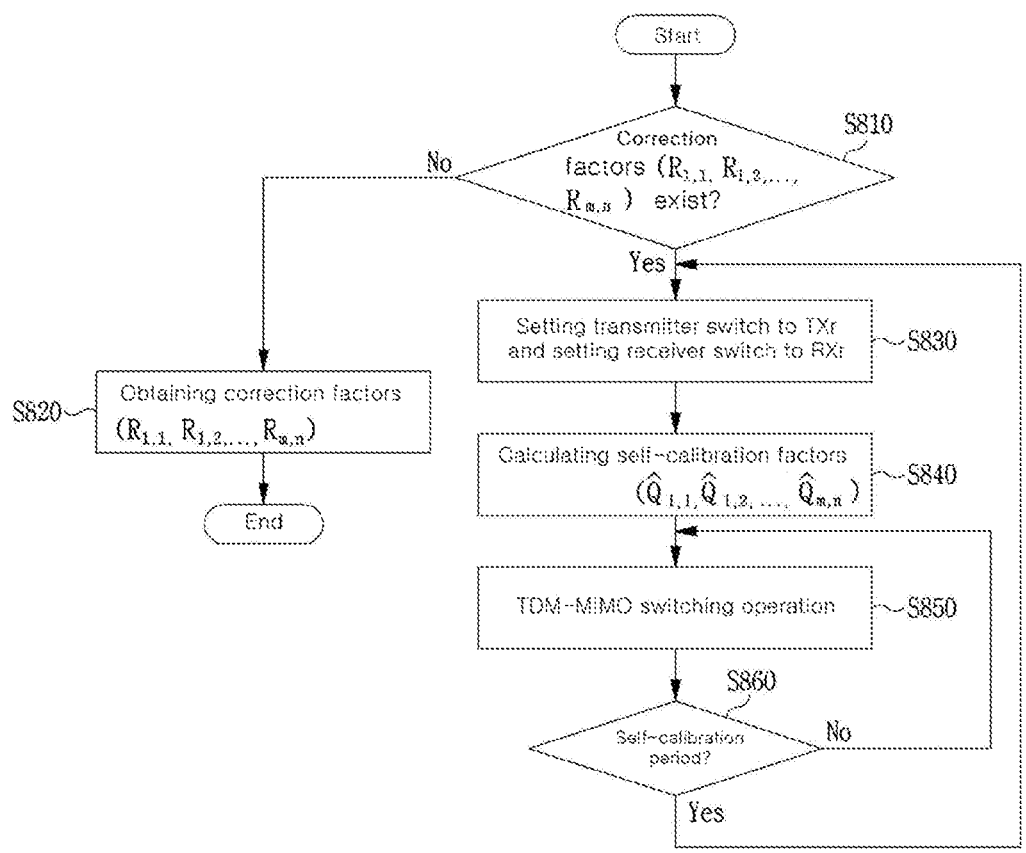

【FIG. 9A】
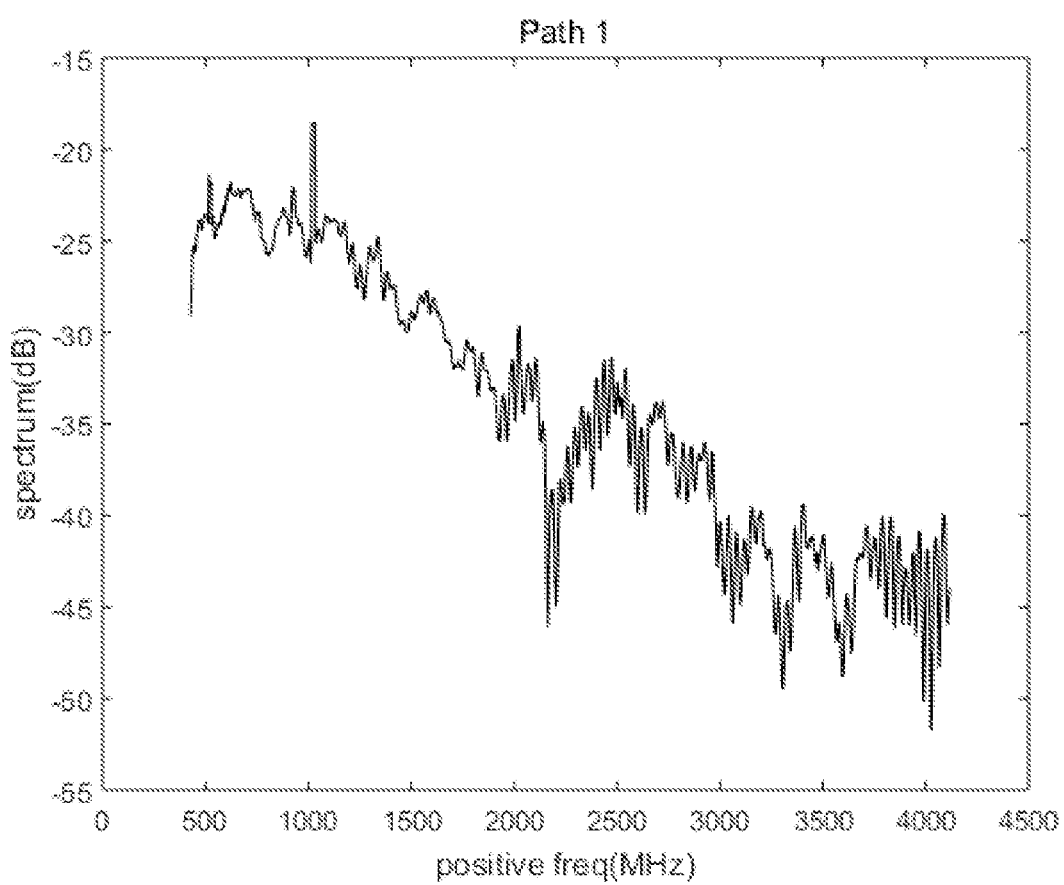

【FIG. 9B】
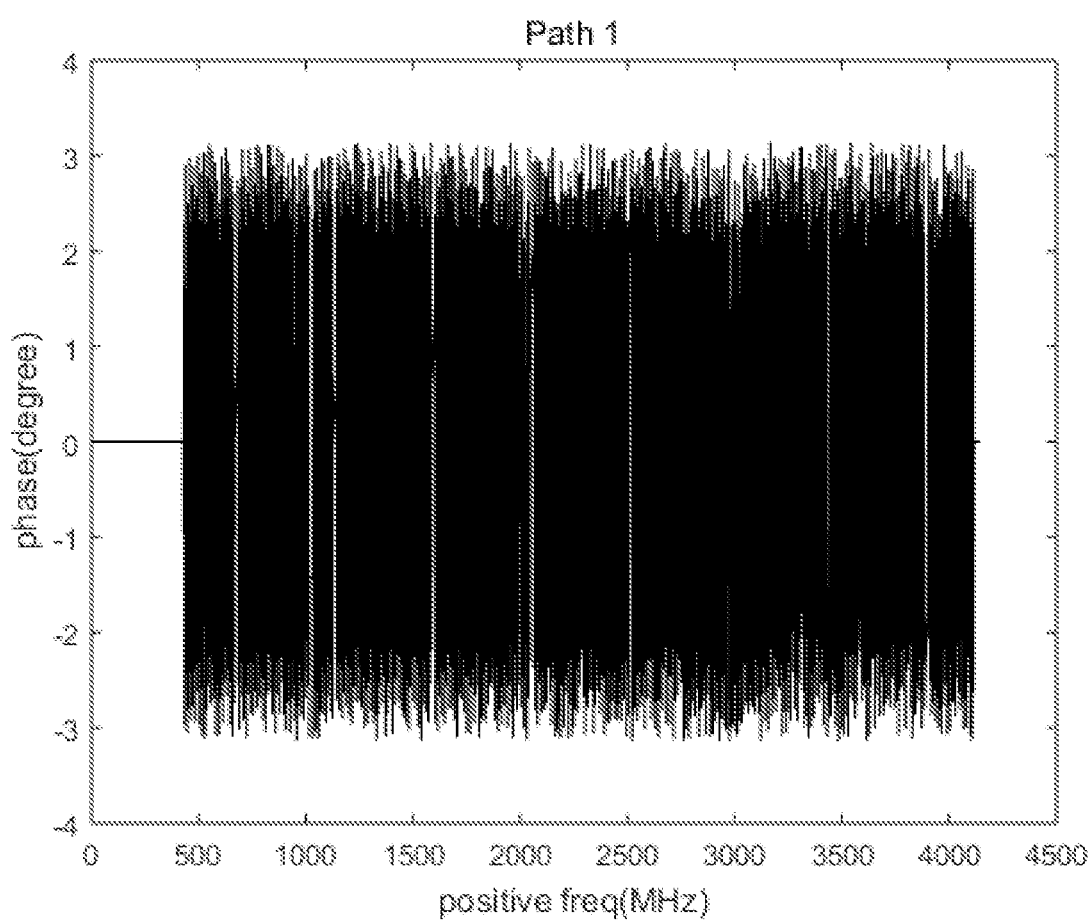

[FIG. 9C]
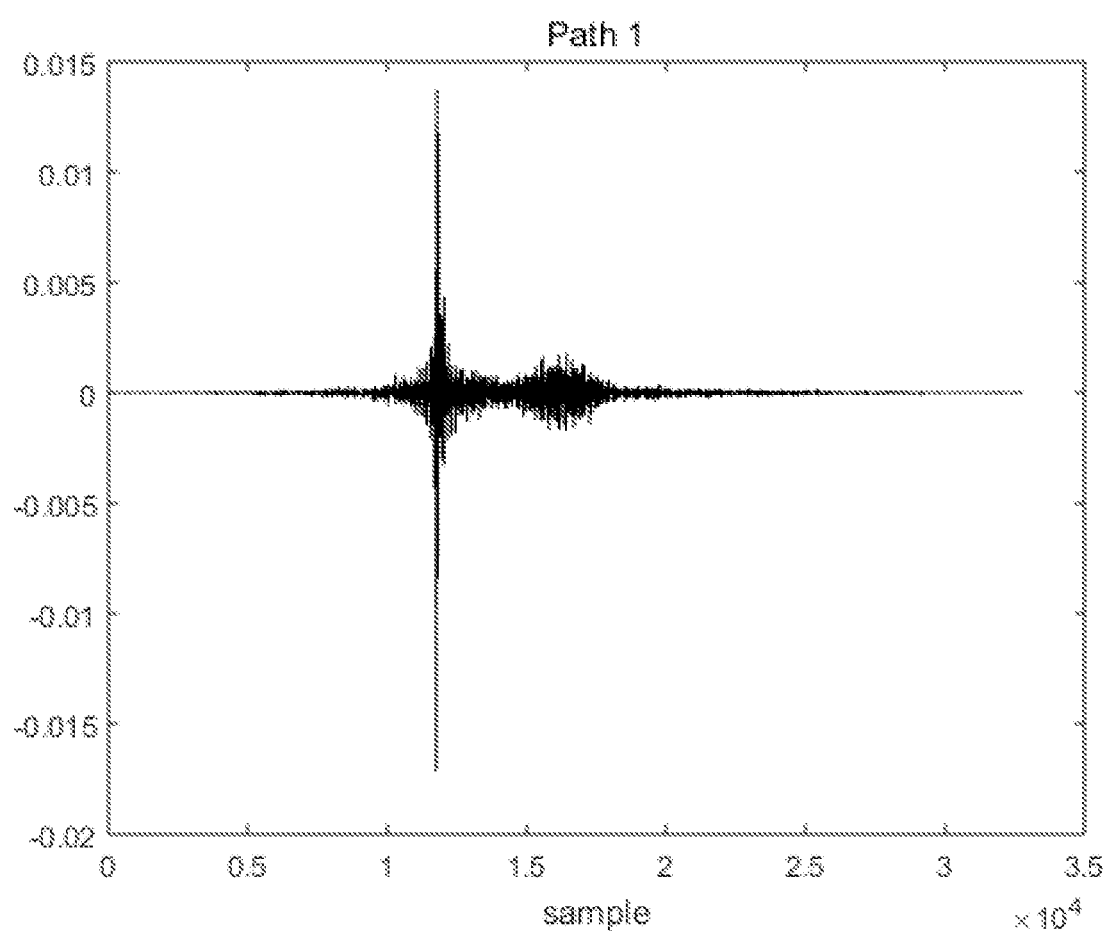

[FIG. 10A]
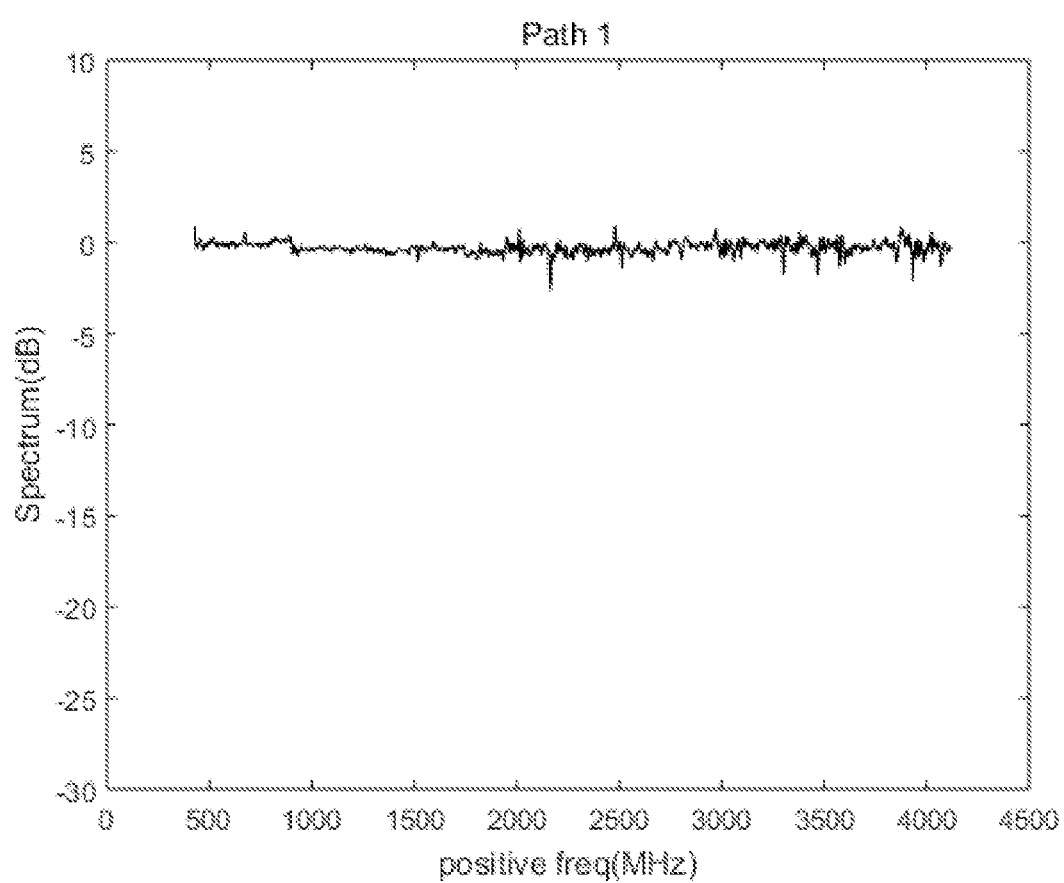

[FIG. 10B]
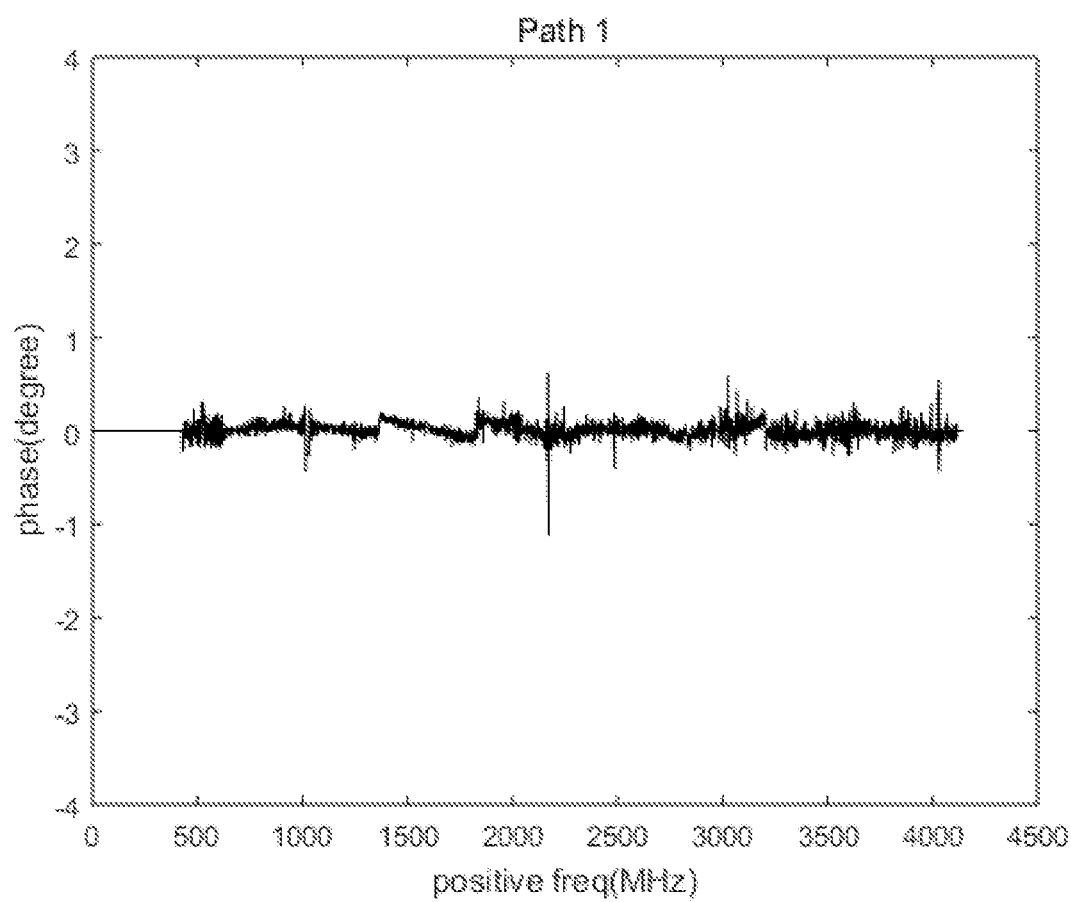

[FIG. 10C]
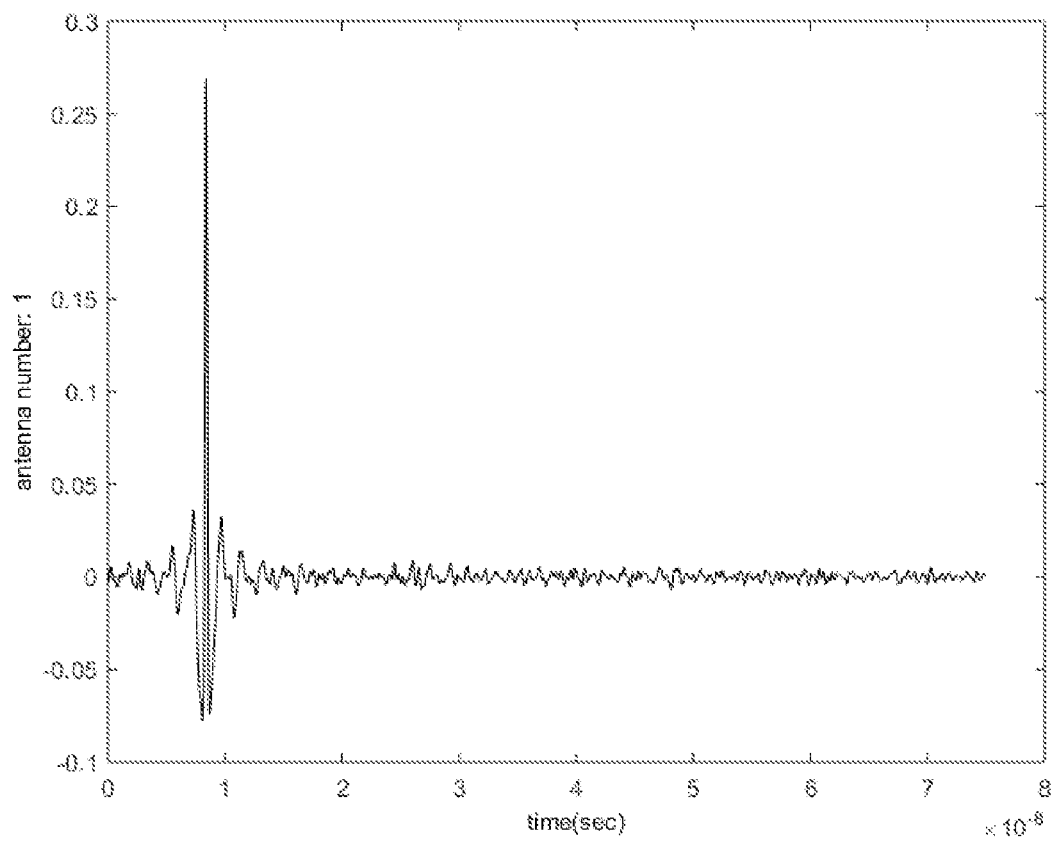

[FIG. 11A]
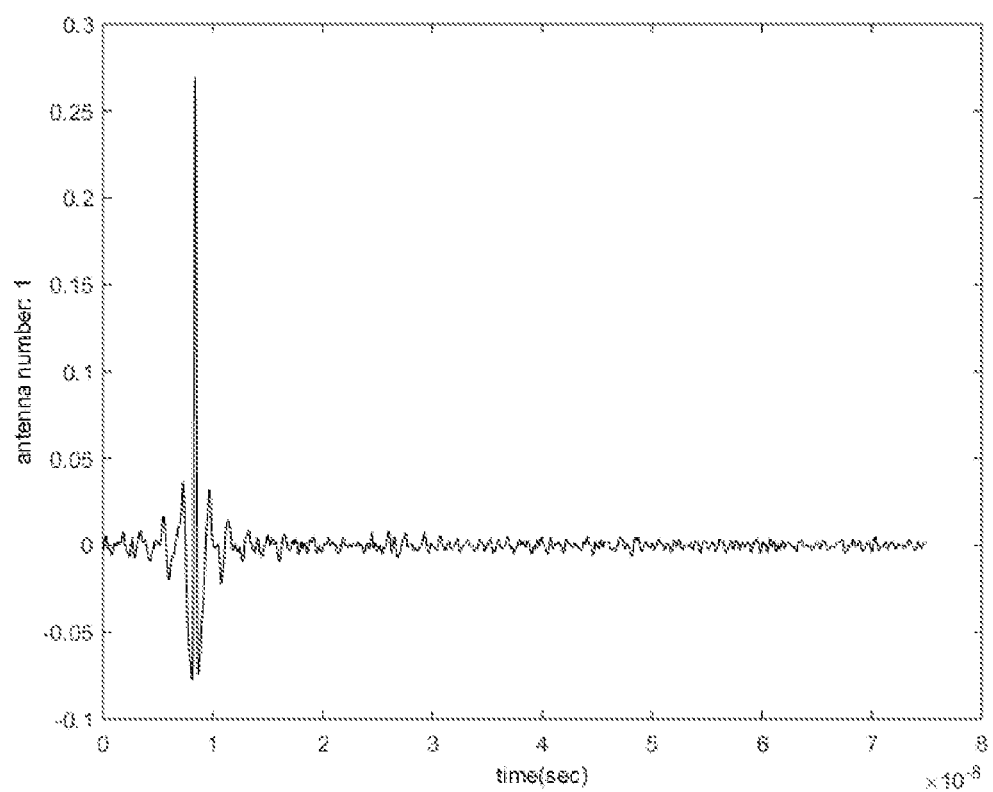

[FIG. 11B]
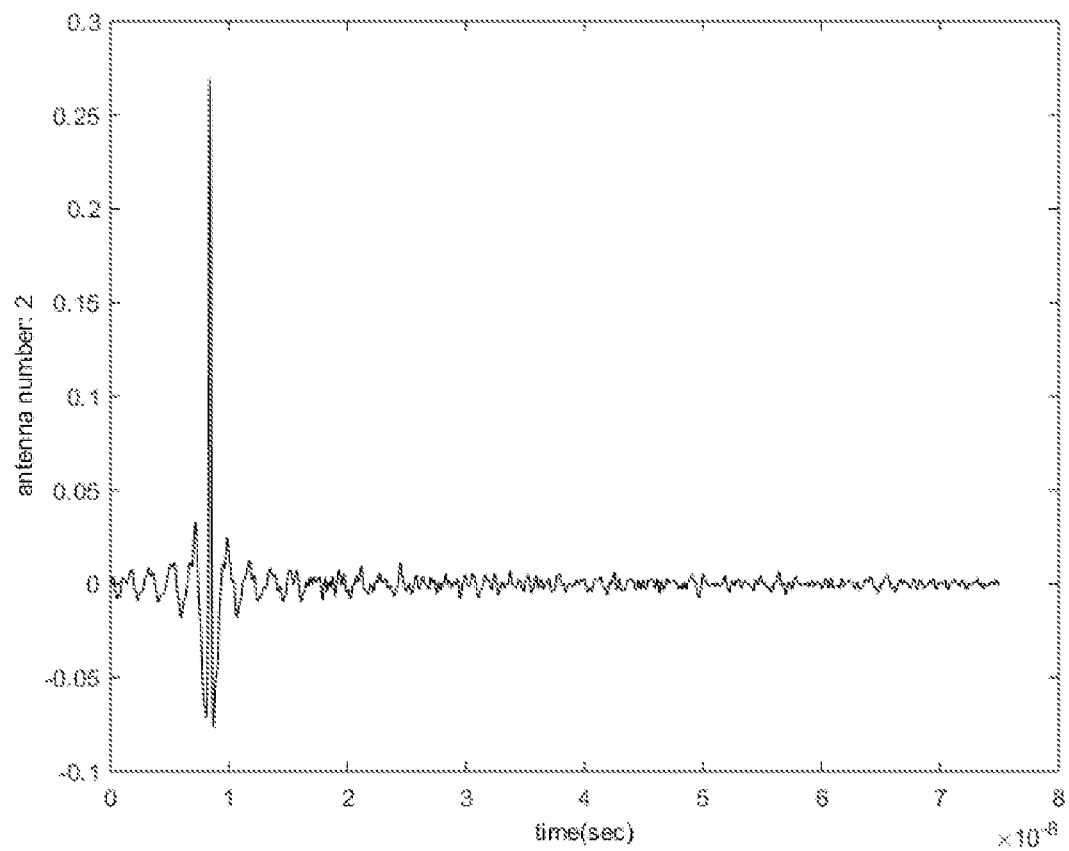

【FIG. 11C】
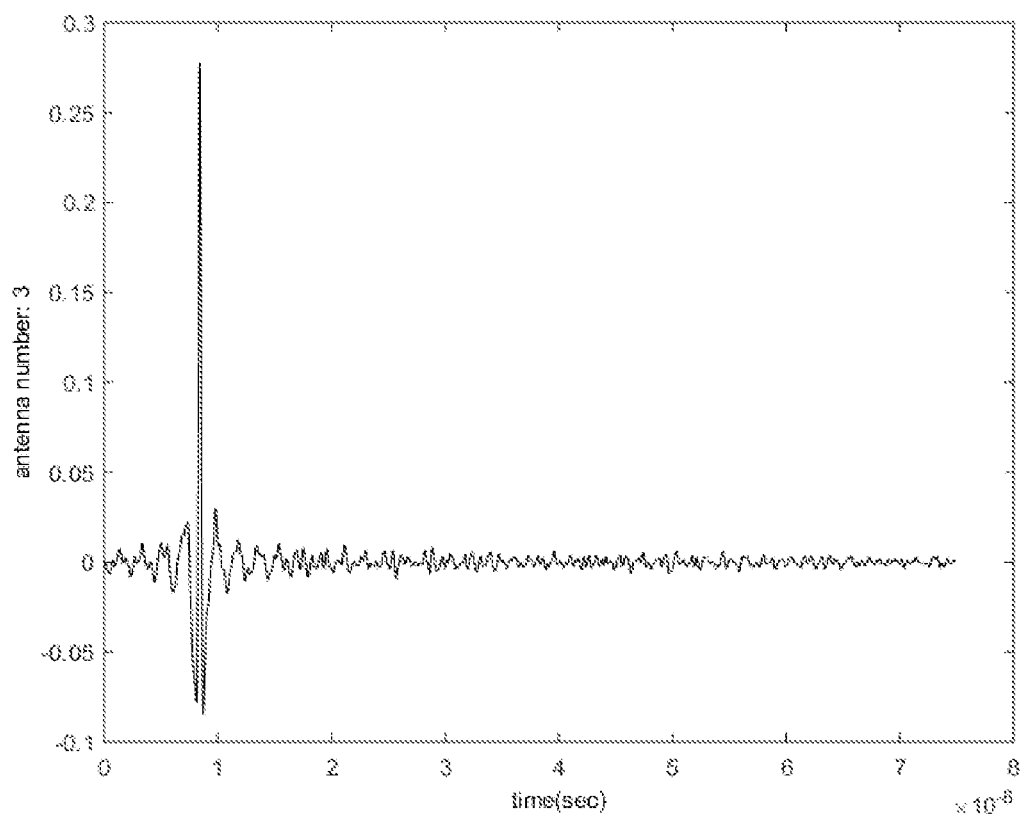

【FIG. 11D】
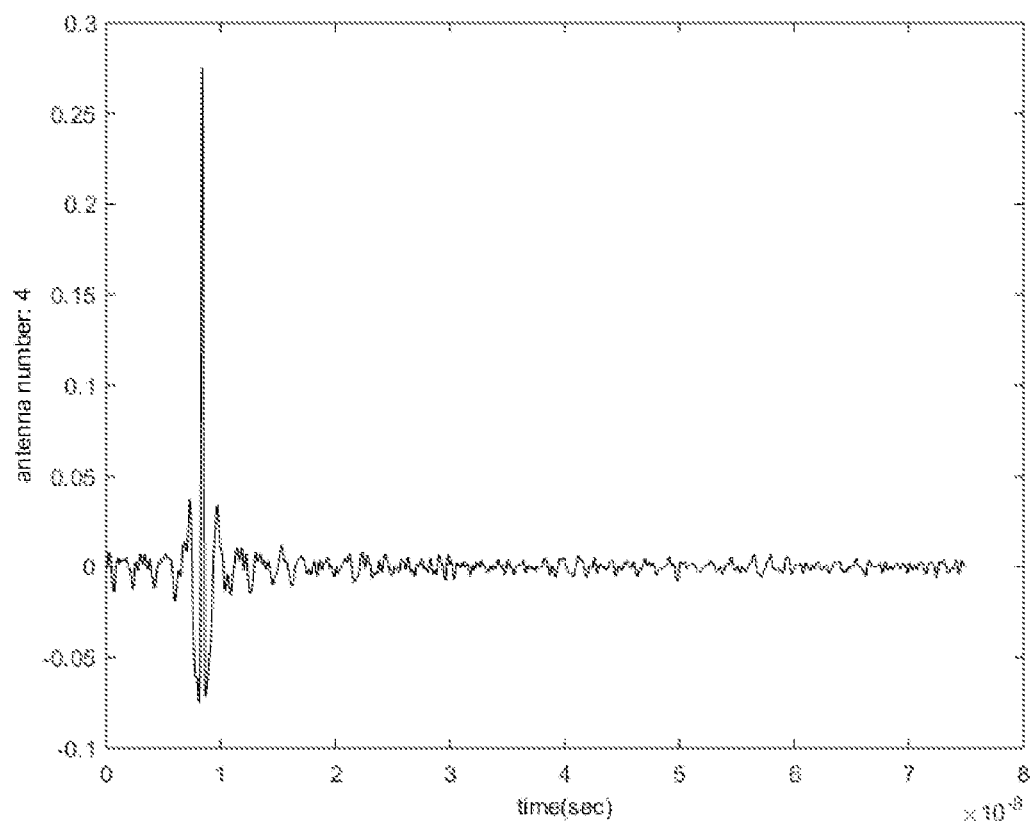

SELF-CALIBRATION METHOD OF SWITCHED ARRAY ANTENNA RADAR

CROSS REFERENCE TO RELATED APPLICATION

The present application claims priority to Korean Patent Application No. 10-2017-0046570, filed Apr. 11, 2017, the entire contents of which is incorporated herein for all purposes by this reference.

BACKGROUND OF THE INVENTION

Field of the Invention

The present disclosure relates generally to a calibration method and apparatus for array antenna radar. More particularly, the present disclosure relates to a self-calibration method and apparatus for a switched array antenna radar.

Description of the Related Art

Recently, radar technology has broadened its applications from the traditional fields of national defense, aviation, and shipping to the fields of autonomous cars, safety, security, position recognition, and bio-signal recognition through various studies. In the field of safety, the technology of remotely, on the ground, detecting bio-signals of survivors buried under the ground in case of a collapse accident has become widely used. In the field of bio-signal recognition, progress has been made in the development of technology of recognizing emergency situations, such as drowsiness, excitement, cardiac arrest, etc., by monitoring the heart rate and the respiration state of the driver in a vehicle. In the field of autonomous cars, progress has been made in the improvement of performance and efficiency of automotive radar with high-precision in the 77 GHz band proceed in order to recognize the surroundings in all directions of the vehicle.

In the above-described technical fields, an array antenna composed of two or more antennas may be used so as to provide a two-dimensional or three-dimensional distance measurement function and an angle of arrival measurement function that are difficult to perform with an single antenna. Particularly, in the technical field of autonomous cars, since the precise recognition of the surroundings of the vehicle is very important, a two-dimensional phased array antenna having a complex array structure is mainly used.

In the case of a conventional array antenna, a phase delay element and an amplifier are provided in each antenna path constituting an array as a default. For example, each antenna is provided with an RF transceiver, or each antenna is provided with a crest factor reduction (CFR)/digital pre-distortion (DPD) module, a digital-analog converter (D/A), an up converter, and a power amplifier (PA).

The conventional structure is problematic in that it is difficult to integrate an array antenna, sensitivity of the performance of the entire array antenna increase in consequence of change in characteristic by element, power consumption is excessive, and the price is high. However, until now, the conventional structure is used despite the problems.

Particularly, since change in characteristics by elements directly greatly affects the performance of the entire antenna, calibration of the array antenna has been widely studied. Also, recently, studies are being conducted on the SAA radar to solve the problems of the conventional array antenna system and practical applications of the SAA radar, and a method of efficiently performing self-calibration of the SAA radar is required.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and the present disclosure is intended to propose a self-calibration method and apparatus for an array antenna system.

Also, the present disclosure is intended to propose a self-calibration method and apparatus for an SAA radar system.

It is to be understood that technical problems to be solved by the present disclosure are not limited to the aforementioned technical problems and other technical problems which are not mentioned will be apparent from the following description to a person with an ordinary skill in the art to which the present disclosure pertains.

In order to achieve the above object, according to one aspect of the present disclosure, there is provided a correction method of an array antenna system including m (m is an integer equal to or greater than one) transmission antennas and n (n is an integer equal to or greater than one) reception antennas, the correction method comprising: deriving, at a first time, a correction factor $R_{i,j}$ for a path connecting an i-th (i is an integer equal to or greater than one and equal to or less than m) transmission antenna and a j-th (j is an integer equal to or greater than one and equal to or less than n) reception antenna; deriving, at a second time, a calibration factor $\hat{Q}_{i,j}$ for the path connecting the i-th transmission antenna and the j-th reception antenna; and performing, based on the $\hat{Q}_{i,j}$, calibration on the path connecting the i-th transmission antenna and the j-th reception antenna.

In the method, the deriving of the correction factor $R_{i,j}$ comprises: deriving inverse system response $Q_{ref}$ for a reference path; deriving inverse system response $Q_{i,j}$ for the path connecting the i-th transmission antenna and the j-th reception antenna; and deriving the correction factor $R_{i,j}$ based on the $Q_{ref}$ and the $Q_{i,j}$. In the method, the correction factor $R_{i,j}$ has a time-invariant constant value.

In the method, the deriving of the correction factor $R_{i,j}$ is performed only once during operation of the array antenna system.

In the method, the deriving of the calibration factor $\hat{Q}_{i,j}$ comprises: deriving inverse system response $\hat{Q}_{ref}$ for a reference path; and deriving the calibration factor $\hat{Q}_{i,j}$ based on the $R_{i,j}$ and the $\hat{Q}_{ref}$.

In the method, the second time is a time subsequent to the first time.

In the method, the deriving of the calibration factor $\hat{Q}_{i,j}$ is periodically performed at predetermined time intervals.

In the method, the correction factor $R_{i,j}$ or the calibration factor $\hat{Q}_{i,j}$ is derived for all paths connecting one of the m transmission antennas and one of the n reception antennas.

In the method, the reference path is a path connecting a transmission reference port of a transmitter antenna switch for selecting one of the m transmission antennas and a reception reference port of a receiver antenna switch for selecting one of the n reception antennas.

In the method, the reference path or the path connecting the i-th transmission antenna and the j-th reception antenna is selected based on a time-division-multiplexing (TDM) control signal input to the transmitter antenna switch and the receiver antenna switch.

According to another aspect of the present disclosure, there is provided a calibration apparatus for an array antenna system, the calibration apparatus comprising: a signal processing unit; m (m is an integer equal to or greater than one) transmission antennas; and n (n is an integer equal to or greater than one) reception antennas, wherein the signal processing unit is configured to, derive, at a first time, a correction factor $R_{i,j}$ for a path connecting an i-th (i is an integer equal to or greater than one and equal to or less than m) transmission antenna and a j-th (j is an integer equal to or greater than one and equal to or less than n) reception antenna; derive, at a second time, a calibration factor $\hat{Q}_{i,j}$ for the path connecting the i-th transmission antenna and the j-th reception antenna; and perform, based on the $\hat{Q}_{i,j}$, calibration on the path connecting the i-th transmission antenna and the j-th reception antenna.

In the apparatus, the signal processing unit is configured to, derive inverse system response $Q_{ref}$ for a reference path, derive inverse system response $Q_{i,j}$ for the path connecting the i-th transmission antenna and the j-th reception antenna, and derive the correction factor $R_{i,j}$ based on the $Q_{ref}$ and the $Q_{i,j}$.

In the apparatus, the correction factor $R_{i,j}$ has a time-invariant constant value.

In the apparatus, the deriving of the correction factor $R_{i,j}$ is performed only once during operation of the array antenna system.

In the apparatus, the signal processing unit is configured to, derive inverse system response $\hat{Q}_{ref}$ for a reference path, and derive the calibration factor $\hat{Q}_{i,j}$ based on the $R_{i,j}$ and the $\hat{Q}_{ref}$.

In the apparatus, the second time is a time subsequent to the first time.

In the apparatus, the deriving of the calibration factor $\hat{Q}_{i,j}$ is periodically performed at predetermined time intervals.

In the apparatus, the correction factor $R_{i,j}$ or the calibration factor $\hat{Q}_{i,j}$ is derived for all paths connecting one of the m transmission antennas and one of the n reception antennas.

In the apparatus, the reference path is a path connecting a transmission reference port of a transmitter antenna switch for selecting one of the m transmission antennas and a reception reference port of a receiver antenna switch for selecting one of the n reception antennas.

In the apparatus, the reference path or the path connecting the i-th transmission antenna and the j-th reception antenna is selected based on a time-division-multiplexing (TDM) control signal input to the transmitter antenna switch and the receiver antenna switch.

According to a further aspect of the present disclosure, there is provided software or a computer-readable medium including executable instructions for implementing the correction method of an array antenna system.

According to the present disclosure, the self-calibration method and apparatus for the array antenna system can be provided.

Also, according to the present disclosure, the self-calibration method and apparatus for the SAA radar system can be provided.

Effects that may be obtained from the present disclosure will not be limited to only the above described effects. In addition, other effects which are not described herein will become apparent to those skilled in the art from the following description.

BRIEF DESCRIPTION OF THE DRAWINGS

The above and other objects, features and other advantages of the present disclosure will be more clearly understood from the following detailed description when taken in conjunction with the accompanying drawings, in which:

FIG. 1 is a view illustrating a receiver self-calibration method of a conventional array antenna system;

FIG. 2 is a view illustrating an embodiment of an SAA radar structure;

FIG. 3 is a view illustrating an embodiment of a radar system to which a self-calibration method according to the present disclosure may be applied;

FIG. 4 is a control timing diagram illustrating an embodiment of a control signal for controlling a transmitter antenna switch or a receiver antenna switch or both of the SAA radar system of FIG. 3;

FIG. 5 is a view schematically illustrating self-calibration target portions in the SAA radar system of FIG. 3;

FIG. 6 is a view illustrating a process of deriving a correction factor $R_{m,n}$ according to an embodiment of the present disclosure;

FIG. 7 is a view illustrating an embodiment of a self-calibration method of an SAA radar system according to the present disclosure;

FIG. 8 is a view illustrating TDM-MIMO operation including a self-calibration algorithm according to an embodiment of the present disclosure;

FIGS. 9A, 9B, and 9C are views illustrating system response characteristics before applying a self-calibration algorithm, in a 4-by-4 SAA radar system;

FIGS. 10A, 10B, and 10C are views illustrating system response characteristics after applying a self-calibration algorithm, in a 4-by-4 SAA radar system; and FIG. 11A-11D illustrating time response characteristics for four paths of TX1-RX1, TX2-RX2, TX3-RX3, and TX4-RX4 after applying a self-calibration algorithm, in a 4-by-4 SAA radar system.

DETAILED DESCRIPTION OF THE INVENTION

Hereinbelow, exemplary embodiments of the present disclosure will be described in detail such that the ordinarily skilled in the art would easily understand and implement an apparatus and a method provided by the present disclosure in conjunction with the accompanying drawings. However, the present disclosure may be embodied in various forms and the scope of the present disclosure should not be construed as being limited to the exemplary embodiments.

In describing embodiments of the present disclosure, well-known functions or constructions will not be described in detail when they may obscure the spirit of the present disclosure.

Further, parts not related to description of the present disclosure are not shown in the drawings and like reference numerals are given to like components.

In the present disclosure, it will be understood that when an element is referred to as being "connected to", "coupled to", or "combined with" another element, it can be directly connected or coupled to or combined with the another element or intervening elements may be present therebetween. It will be further understood that the terms "comprises", "includes", "have", etc. when used in the present disclosure specify the presence of stated features, integers, steps, operations, elements, components, and/or combinations thereof but do not preclude the presence or addition of one or more other features, integers, steps, operations, elements, components, and/or combinations thereof.

It will be understood that, although the terms "first", "second", etc. may be used herein to describe various elements, these elements should not be limited by these terms. These terms are only used to distinguish one element from another element and not used to show order or priority among elements. For instance, a first element discussed below could be termed a second element without departing from the teachings of the present disclosure. Similarly, the second element could also be termed as the first element.

In the present disclosure, distinguished elements are termed to clearly describe features of various elements and do not mean that the elements are physically separated from each other. That is, a plurality of distinguished elements may be combined into a single hardware unit or a single software unit, and conversely one element may be implemented by a plurality of hardware units or software units. Accordingly, although not specifically stated, an integrated form of various elements or separated forms of one element may fall within the scope of the present disclosure.

In the present disclosure, all of the constituent elements described in various embodiments should not be construed as being essential elements but some of the constituent elements may be optional elements. Accordingly, embodiments configured by respective subsets of constituent elements in a certain embodiment also may fall within the scope of the present disclosure. In addition, embodiments configured by adding one or more elements to various elements also may fall within the scope of the present disclosure.

Hereinbelow, exemplary embodiments of the present disclosure will be described in detail with reference to the accompanying drawings. Throughout the drawings, the same reference numerals will refer to the same or like parts.

FIG. 1 is a view illustrating a receiver self-calibration method of a conventional array antenna system.

The conventional array antenna system shown in FIG. 1 may include a signal processing unit 110, a transmitter 120, n analog-to-digital converters (A/Ds) 130-1 to 130-n, a transmitter antenna switch 140, receiver antenna switches 150-1 to 150-n, amplifiers 160 and 170-1 to 170-n, phase delay elements 180-1 to 180-n, a transmission antenna TX, and/or reception antennas RX1 to RXn.

In order to calibrate the array antenna system shown in FIG. 1, it is required to connect a calibration path for each antenna path. For calibration of a receiver array antenna, the transmitter antenna switch 140 connects output signals of the transmission antenna TX of FIG. 1 to respective reception antenna paths via the receiver antenna switches SW1 150-1 to SWn 150-n. When the receiver antenna switches SW1 150-1 to SWn 150-n are connected to the output signals of the transmission antenna TX, a calibration unit (not shown) of the signal processing unit 110 may receive signals output from the A/Ds 130-1 to 130-n and may calibrate respective reception paths.

The self-calibration method of the array antenna system of FIG. 1 requires a calibration connection line for each reception path, and thus the circuit is complex. Also, since connection lines on the circuit are increased, signal interference on the circuit occurs. Also, in order to calibrate the array antenna system of FIG. 1, it is required to periodically perform calibration by path on the respective reception antenna paths as well as a transmission antenna path in the same manner.

Recently, the structure of the array antenna has been extended from a conventional one-dimensional array to a two-dimensional array. Particularly, in the field of an automotive radar where high resolution is required or a buried bio-signal radar where weak signal detection is required, the structure of the array antenna is more complex.

As the structure of the array antenna is complex, studies have been conducted for enhancing the structure of the array antenna where the amplifier or the phase delay element or both are provided for each antenna path. Recently, a switched array antenna (SAA) or time-division multiplexing (TDM) multiple-input multiple-output (MIMO)-based radar has been widely studied.

FIG. 2 is a view illustrating an embodiment of an SAA radar structure.

As shown in FIG. 2, the SAA radar may include a signal processing unit 210, a transmitter 220, an A/D 230, a receiver antenna switch 250, amplifiers 240 and 260, a phase delay element 270, a transmission antenna TX, and/or reception antennas RX1 to RXn.

The array antenna system of FIG. 1 includes amplifiers and phase delay elements for respective paths. However, in the SAA radar shown in FIG. 2, multiple reception antennas RX1 to RXn are connected to a single receiver antenna switch 250. Also, the multiple reception antennas RX1 to RXn may be connected to a single amplifier 260 or a single phase delay element 270 or both.

The SAA radar of FIG. 2 is simple in structure and the number of used elements is smaller than that of the array antenna system of FIG. 1, and thus the SAA radar of FIG. 2 is suitable for optimizing the price, reliability, and size.

The SAA radar may be applied as an automotive FMCW radar, a miniature radar for mobile devices, and a Through-Wall imaging radar, etc. Recently, studies have been conducted on a method of optimizing a switching sequence of the SAA, but studies have yet to be conducted on a calibration method of the SAA radar. The present disclosure relates to a calibration method of an array antenna system, particularly, a self-calibration method of an SAA radar system.

FIG. 3 is a view illustrating an embodiment of a radar system to which a self-calibration method according to the present disclosure may be applied.

The radar system of FIG. 3 may have a structure of the SAA radar system having time-division-multiplexing-MIMO (TDM-MIMO) function.

The SAA radar system of FIG. 3 may include a signal processing unit 310, a transmitter 320 generating radar signals, an analog-to-digital converter (A/D) 330, a (m+1)-port transmitter antenna switch 340 for transmitter antenna switching, a (n+1)-port receiver antenna switch 350 for receiver antenna switching, amplifiers 360 and 370, mixers 380 and 390, a frequency control oscillator 395, transmission antennas TX1 to TXm, and/or reception antennas RX1 to RXn.

The signal processing unit 310 may perform control functions of respective components or a self-calibration function of the system or both through a control line. In FIG. 3, lines connecting components as well as the signal processing unit 310 may be used as the control line, a signal line, or a communication line, or all.

FIG. 4 is a control timing diagram illustrating an embodiment of a control signal for controlling a transmitter antenna switch or a receiver antenna switch or both of the SAA radar system of FIG. 3.

Controlling of the transmitter antenna switch 340 and the receiver antenna switch 350 may be performed by selecting the transmission antennas TX1 to TXm and the reception antennas RX1 to RXn in the time-division-multiplexing (TDM) manner as shown in the timing diagram of FIG. 4.

In FIG. 3, a TXr port and an RXr port of the transmitter antenna switch 340 and the receiver antenna switch 350 may be reference ports used in self-calibration. Specific functions of the TXr port and RXr port will be described with the description of the self-calibration method below.

In FIG. 3, x and y correspond to an input signal and an output signal respectively in a self-calibration algorithm below.

In the SAA radar system of FIG. 3, self-calibration target portions may include the (m+1)-port transmitter antenna switch 340, the (n+1)-port receiver antenna switch 350, the amplifiers 360 and 370, or the mixers 380 and 390, or all.

FIG. 5 is a view schematically illustrating self-calibration target portions in the SAA radar system of FIG. 3.

In FIG. 5, a transmission path 510 may include transmission path elements, such as the mixer 380 or the amplifier 360 or both of FIG. 3. Also, a reception path 520 may include reception path elements, such as the mixer 390 or the amplifier 370 or both of FIG. 3.

In FIG. 5, inverse system response $Q_{ref}$ for a reference path 530 may be derived as Equation 1 below.

$$Q_{ref}(f) = \frac{X(f)}{Y(f)} \qquad \text{[Equation 1]}$$

The inverse system response for a path other than the reference path 530, e.g. the path between the i-th transmission antenna port and the j-th reception antenna port may be designated by $Q_{i,j}(f)$. i may be an integer equal to or greater than one, and equal to or less than m. j may be an integer equal to or greater than one, and equal to or less than n. Here, a correction factor $R_{i,j}$ for a path between the i-th transmission antenna port and the j-th reception antenna port may be defined as Equation 2 below.

$$R_{i,j}(f) = \frac{Q_{i,j}(f)}{Q_{ref}(f)} \qquad \text{[Equation 2]}$$

Equation 2 may be represented by Equation 3 below.

$$R_{i,j} = \frac{Q_{i,j}}{Q_{ref}} = \frac{H_{ref}}{H_{i,j}} = \frac{H_S H_{CC}}{H_S H_{i,jC}} = \frac{H_{CC}}{H_{i,jC}} \qquad \text{[Equation 3]}$$

In Equation 3, $H_{CC}$ is the time-invariant response part of the reference path 530, and $H_{i,jC}$ is the time-invariant response part of the i-th transmission and j-th reception path. Also, $H_S$ is the time-variant response part of the system.

As shown in Equation 3, the correction factor $R_{i,j}$ for the path between the i-th transmission antenna port and the j-th reception antenna port is derived from the time-invariant response parts $H_{CC}$ and $H_{i,jC}$. Therefore, the correction factor $R_{i,j}$ has the time-invariant value, i.e., a constant value.

The correction factor $R_{i,j}$ used in the self-calibration algorithm according to the present disclosure may be obtained in advance. In order to obtain the correction factor $R_{i,j}$, the i-th transmission antenna port is connected to the j-th reception antenna port to form a path, and then the inverse system response $Q_{i,j}$ is obtained. The obtained inverse system response $Q_{i,j}$ and the inverse system response $Q_{ref}$ for the reference path 530 are substituted into Equation 2, such that the correction factor $R_{i,j}$ can be obtained.

FIG. 6 is a view illustrating a process of deriving the correction factor $R_{i,j}$ according to an embodiment of the present disclosure.

At step S610, the inverse system response $Q_{ref}$ for the reference path 530 may be derived using Equation 1. The reference path 530 may be always connected, or may be connected by control of the signal processing unit 310. When the reference path 530 is connected, the signal processing unit 310 may select the transmission antenna and the reception antenna as TXr and RXr, and may obtain $Q_{ref}$ using Equation 1. The control signal 420 of FIG. 4 may be used to select the transmission antenna and the reception antenna as TXr and RXr.

At step S620, the inverse system response for the path between the i-th transmission antenna port and the j-th reception antenna port may be derived using Equation 1. When there are multiple transmission antennas and reception antennas, inverse system responses $Q_{1,1}, Q_{1,2}, \ldots,$ and $Q_{m,n}$ for all transmission antenna-reception antenna combinations may be derived.

At step S630, the time-invariant correction factor $R_{i,j}$ may be calculated using Equation 2. In calculation of Equation 2, one of $Q_{ref}, Q_{1,1}, Q_{1,2}, \ldots,$ and $Q_{m,n}$ derived at steps S610 and S620 may be used. When there are multiple transmission antennas and reception antennas, correction factors $R_{1,1}, R_{1,2}, \ldots$ and $R_{m,n}$ for all transmission antenna-reception antenna combinations may be derived.

Since the correction factor $R_{i,j}$ is a time-invariant constant value, it is sufficient to obtain the correction factor $R_{i,j}$ only once. For example, when the SAA radar system is initially assembled, the correction factor $R_{i,j}$ is obtained once, and after that, it is unnecessary to obtain the correction factor $R_{i,j}$.

Self-calibration of the SAA radar system according to the present disclosure may be performed after or immediately after the SAA radar system is turned on. Self-calibration of the SAA radar system according to the present disclosure may be periodically performed according to a calibration period 410 of FIG. 4.

FIG. 7 is a view illustrating an embodiment of a self-calibration method of an SAA radar system according to the present disclosure.

At step S710, the inverse system response $\hat{Q}_{ref}$ of the reference path 530 may be obtained. The reference path 530 may be always connected, or may be connected by control of the signal processing unit 310. When the reference path 530 is connected, the signal processing unit 310 may select the transmission antenna and the reception antenna as TXr and RXr, and may obtain $\hat{Q}_{ref}$ using Equation 1. The control signal 420 of FIG. 4 may be used to select the transmission antenna and the reception antenna as TXr and RXr. After obtaining $\hat{Q}_{ref}$, a self-calibration factor $\hat{Q}_{i,j}$ of the i-th transmission antenna port and the j-th reception antenna port may be calculated. When there are multiple transmission antennas and reception antennas, self-calibration factors $\hat{Q}_{1,1}, \hat{Q}_{1,2}, \ldots \hat{Q}_{m,n}$ for all transmission antenna-reception antenna combinations may be derived. For calculation of $\hat{Q}_{i,j}$, Equation 4 below may be used.

$$\hat{Q}_{i,j}(f) = \hat{Q}_{ref}(f) \cdot R_{i,j} \qquad \text{[Equation 4]}$$

Equation 4 may be described as Equation 5 below.

$$\hat{Q}_{ref}(f) \cdot R_{i,j} = \frac{1}{\hat{H}_S H_{CC}} \frac{H_{CC}}{H_{i,jC}} = \frac{1}{\hat{H}_S H_{i,jC}} = \hat{Q}_{i,j} \quad \text{[Equation 5]}$$

As shown in Equation 5, Equation 4 may be viewed as a Equation for deriving a new calibration factor of the i-th transmission antenna port and the j-th reception antenna port at the time of measuring $\hat{Q}_{ref}$.

The self-calibration method described with reference to FIG. 7 may be periodically performed after the SAA radar system is turned on or during system operation. Consequently, the SAA radar system can always be maintained in a calibrated state.

FIG. 8 is a view illustrating TDM-MIMO operation including a self-calibration algorithm according to an embodiment of the present disclosure.

At step S810, whether or not the correction factor $R_{i,j}$ exists may be checked. When there are multiple transmission antennas and reception antennas, whether or not correction factors $R_{1,1}$, $R_{1,2}$, . . . , and $R_{m,n}$ for all transmission antenna-reception antenna combinations exist may be checked.

When the correction factor $R_{i,j}$ is absent (in the case of no at step S810), step S820 may be performed. At step S820, the correction factor $R_{i,j}$ may be derived. When there are multiple transmission antennas and reception antennas, correction factors $R_{1,1}$, $R_{1,2}$, . . . , $R_{m,n}$ for all transmission antenna-reception antenna combinations may be derived. In order to derive the correction factor $R_{i,j}$, for example, the process of deriving the correction factor $R_{i,j}$ described with reference to FIG. 6 may be performed.

When the correction factor $R_{i,j}$ exists (in the case of yes at step S810), step S830 may be performed. As described above, since the correction factor $R_{i,j}$ has the time-invariant value, once the correction factor $R_{i,j}$ is obtained, it is unnecessary to calculate the correction factor $R_{i,j}$. Therefore, when the correction factor $R_{i,j}$ exists, it is unnecessary to perform step S820 again.

Through steps S830 and S840, the self-calibration factor $\hat{Q}_{i,j}$ of the i-th transmission antenna port and the j-th reception antenna port may be calculated. When there are multiple transmission antennas and reception antennas, self-calibration factors $\hat{Q}_{1,1}$, $\hat{Q}_{1,2}$, . . . , $\hat{Q}_{m,n}$ for all transmission antenna-reception antenna combinations may be calculated. In order to calculate the self-calibration factor $\hat{Q}_{i,j}$, for example, the process of calculating the calibration factor described with reference to FIG. 7 may be performed.

When the self-calibration factors $\hat{Q}_{1,1}$, $\hat{Q}_{1,2}$, . . . , $\hat{Q}_{m,n}$ are calculated at steps S830 and S840, these can be used to calibrate respective paths.

At step S850, a TDM-MIMO switching operation may be performed through the calibrated paths.

At step S860, whether it is a self-calibration period may be determined. As described above, self-calibration may be periodically performed. When determining it is a self-calibration period at step S860, step S830 may be performed, new self-calibration factors may be calculated, and calibration may be performed using the new calculated self-calibration factors. When determining it is not a self-calibration period at step S860, a normal TDM-MIMO switching operation may be further performed at step S850.

Although not shown in FIG. 8, at step S860, whether self-calibration is necessary may be performed regardless of determining the self-calibration period. Alternatively, when self-calibration is not periodically performed, whether self-calibration is necessary may be determined by another criterion at step S860. Whether self-calibration is necessary may be determined by various criteria. Alternatively, self-calibration may be performed based on an external input from the system manager, etc.

FIGS. 9A, 9B, and 9C are views illustrating system response characteristics before applying a self-calibration algorithm, in a 4-by-4 SAA radar system.

FIGS. 9A, 9B, and 9C are views respectively illustrating frequency response, phase response, and time response for TX1 and RX1 paths before applying a self-calibration algorithm.

FIGS. 10A, 10B, and 10C are views illustrating system response characteristics after applying a self-calibration algorithm, in a 4-by-4 SAA radar system.

FIGS. 10A, 10B, and 10C are views respectively illustrating frequency response, phase response, and time response for TX1 and RX1 paths after applying a self-calibration algorithm.

From comparison between FIGS. 9A, 9B, and 9C and FIGS. 10A, 10B, and 10C, calibration results in frequency response, phase response, and time response may be verified.

FIG. 11 is a view illustrating time response characteristics for four paths of TX1-RX1, TX2-RX2, TX3-RX3, and TX4-RX4 after applying a self-calibration algorithm, in a 4-by-4 SAA radar system.

As shown in FIG. 11, time response characteristics in which four paths are equally calibrated may be verified.

As described above, the present disclosure proposes a self-calibration method for an SAA radar system that is effective in simplifying the complex structure of an array antenna in the field of an array antenna radar technology of which an application range thereof has expanded.

According to the self-calibration method of the present disclosure, calibration of the SAA radar system in real time can be performed in a very short time. Also, calibration is can be periodically performed, and thus the SAA radar system can always have the optimum performance.

Although exemplary methods of the present disclosure are described as a series of operation steps for clarity of a description, the present disclosure is not limited to the sequence or order of the operation steps described above. The operation steps may be simultaneously performed, or may be performed sequentially but in different order. In order to implement the method of the present disclosure, additional operation steps may be added and/or existing operation steps may be eliminated or substituted.

Various embodiments of the present disclosure are not presented to describe all of available combinations but are presented to describe only representative combinations. Steps or elements in various embodiments may be separately used or may be used in combination.

In addition, various embodiments of the present disclosure may be embodied in the form of hardware, firmware, software, or a combination thereof. When the present disclosure is embodied in a hardware component, it may be, for example, an application specific integrated circuit (ASIC), a digital signal processor (DSP), a digital signal processing device (DSPD), a programmable logic device (PLD), a field programmable gate array (FPGA), a general processor, a controller, a microcontroller, a microprocessor, etc.

The scope of the present disclosure includes software or machine-executable instructions (for example, operating systems (OS), applications, firmware, programs) that enable methods of various embodiments to be executed in an apparatus or on a computer, and a non-transitory computer-readable medium storing such software or machine-execut-

What is claimed is:

1. A correction method of an array antenna system including m transmission antennas and n reception antennas, wherein m and n are integers greater than one, the correction method comprising:
deriving, at a first time, a correction factor $R_{i,j}$ for a path connecting an i-th transmission antenna and a j-th reception antenna, wherein i is an integer equal to or greater than one and equal to or less than m, and j is an integer equal to or greater than one and equal to or less than n;
deriving, at a second time, a calibration factor $\hat{Q}_{i,j}$ for the path connecting the i-th transmission antenna and the j-th reception antenna; and
performing, based on the calibration factor $\hat{Q}_{i,j}$, calibration on the path connecting the i-th transmission antenna and the j-th reception antenna,
wherein the deriving of the correction factor $R_{i,j}$ comprises:
deriving a first reference inverse system response $Q_{ref}$ for a reference path;
deriving an inverse system response $Q_{i,j}$ for the path connecting the i-th transmission antenna and the j-th reception antenna; and
deriving the correction factor $R_{i,j}$ based on the first reference inverse system response $Q_{ref}$ and the inverse system response $Q_{i,j}$.

2. The correction method of claim 1, wherein the correction factor $R_{i,j}$ has a time-invariant constant value.

3. The correction method of claim 1, wherein the deriving of the correction factor $R_{i,j}$ is performed only once during operation of the array antenna system.

4. The correction method of claim 1, wherein the deriving of the calibration factor $\hat{Q}_{i,j}$ comprises:
deriving a second reference inverse system response $\hat{Q}_{ref}$ for the reference path; and
deriving the calibration factor $\hat{Q}_{i,j}$ based on the correction factor $R_{i,j}$ and the second reference inverse system response $\hat{Q}_{ref}$.

5. The correction method of claim 1, wherein the second time is a time subsequent to the first time.

6. The correction method of claim 1, wherein the deriving of the calibration factor $\hat{Q}_{i,j}$ is periodically performed at predetermined time intervals.

7. The correction method of claim 1, wherein the correction factor $R_{i,j}$ or the calibration factor $\hat{Q}_{i,j}$ is derived for all paths connecting one of the m transmission antennas and one of the n reception antennas.

8. The correction method of claim 1, wherein the reference path is a path connecting a transmission reference port of a transmitter antenna switch for selecting one of the m transmission antennas and a reception reference port of a receiver antenna switch for selecting one of the n reception antennas.

9. The correction method of claim 8, wherein the reference path or the path connecting the i-th transmission antenna and the j-th reception antenna is selected based on a time-division-multiplexing (TDM) control signal input to the transmitter antenna switch and the receiver antenna switch.

10. A calibration apparatus for an array antenna system, the calibration apparatus comprising:
m transmission antennas, wherein m is an integer equal to or greater than one;
n reception antennas, wherein n is an integer equal to or greater than one; and
a signal processing unit is configured to:
derive, at a first time, a correction factor $R_{i,j}$ for a path connecting an i-th transmission antenna and a j-th reception antenna, wherein i is an integer equal to or greater than one and equal to or less than m, and j is an integer equal to or greater than one and equal to or less than n;
derive, at a second time, a calibration factor $\hat{Q}_{i,j}$ for the path connecting the i-th transmission antenna and the j-th reception antenna; and
perform, based on the calibration factor $\hat{Q}_{i,j}$, calibration on the path connecting the i-th transmission antenna and the j-th reception antenna,
wherein the signal processing unit is further configured to derive the correction factor $R_{i,j}$ by deriving a first reference inverse system response $Q_{ref}$ for a reference path, deriving an inverse system response $Q_{i,j}$ for the path connecting the i-th transmission antenna and the j-th reception antenna, and deriving the correction factor $R_{i,j}$ based on the first reference inverse system response $Q_{ref}$ and the inverse system response $Q_{i,j}$.

11. The calibration apparatus of claim 10, wherein the correction factor $R_{i,j}$ has a time-invariant constant value.

12. The calibration apparatus of claim 10, wherein the deriving of the correction factor $R_{i,j}$ is performed only once during operation of the array antenna system.

13. The calibration apparatus of claim 10, wherein the signal processing unit is further configured to:
derive a second reference inverse system response $\hat{Q}_{ref}$ for the reference path, and
derive the calibration factor $\hat{Q}_{i,j}$ based on the correction factor $R_{i,j}$ and the second reference inverse system response $\hat{Q}_{ref}$.

14. The calibration apparatus of claim 10, wherein the second time is a time subsequent to the first time.

15. The calibration apparatus of claim 10, wherein the deriving of the calibration factor $\hat{Q}_{i,j}$ is periodically performed at predetermined time intervals.

16. The calibration apparatus of claim 10, wherein the correction factor $R_{i,j}$ or the calibration factor $\hat{Q}_{i,j}$ is derived for all paths connecting one of the m transmission antennas and one of the n reception antennas.

17. The calibration apparatus of claim 10, wherein the reference path is a path connecting a transmission reference port of a transmitter antenna switch for selecting one of the m transmission antennas and a reception reference port of a receiver antenna switch for selecting one of the n reception antennas.

18. The calibration apparatus of claim 17, wherein the reference path or the path connecting the i-th transmission antenna and the j-th reception antenna is selected based on a time-division-multiplexing (TDM) control signal input to the transmitter antenna switch and the receiver antenna switch.

19. A correction method of an array antenna system including m transmission antennas and n reception antennas, wherein m and n are integers greater than one, the correction method comprising:
deriving, at a first time, a correction factor $R_{i,j}$ for a path connecting an i-th transmission antenna and a j-th reception antenna, wherein i is an integer equal to or greater than one and equal to or less than m, and j is an integer equal to or greater than one and equal to or less than n;

deriving, at a second time, a calibration factor $\hat{Q}_{i,j}$ for the path connecting the i-th transmission antenna and the j-th reception antenna; and performing, based on the calibration factor $\hat{Q}_{i,j}$, calibration on the path connecting the i-th transmission antenna and the j-th reception antenna, wherein the deriving of the calibration factor $\hat{Q}_{i,j}$ comprises:

deriving a reference inverse system response $\hat{Q}_{ref}$ for a reference path; and deriving the calibration factor $\hat{Q}_{i,j}$ based on the correction factor $R_{i,j}$ and the reference inverse system response $\hat{Q}_{ref}$.

20. A calibration apparatus for an array antenna system, the calibration apparatus comprising:

m transmission antennas, wherein m is an integer equal to or greater than one;

n reception antennas, wherein n is an integer equal to or greater than one; and a signal processing unit is configured to:

derive, at a first time, a correction factor $R_{i,j}$ for a path connecting an i-th transmission antenna and a j-th reception antenna, wherein i is an integer equal to or greater than one and equal to or less than m, and j is an integer equal to or greater than one and equal to or less than n;

derive, at a second time, a calibration factor $\hat{Q}_{i,j}$ for the path connecting the i-th transmission antenna and the j-th reception antenna; and perform, based on the calibration factor $\hat{Q}_{i,j}$, calibration on the path connecting the i-th transmission antenna and the j-th reception antenna, wherein the signal processing unit is further configured to derive the calibration factor $\hat{Q}_{i,j}$ by deriving a reference inverse system response $\hat{Q}_{ref}$ for a reference path, and deriving the calibration factor $\hat{Q}_{i,j}$ based on the correction factor $R_{i,j}$ and the reference inverse system response $\hat{Q}_{ref}$.

* * * * *